United States Patent
Iino et al.

(10) Patent No.: US 7,975,570 B2
(45) Date of Patent: Jul. 12, 2011

(54) OPERATION LEVER STRUCTURE

(75) Inventors: Keiji Iino, Wako (JP); Kazuyoshi Miyahara, Wako (JP); Seishu Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 12/274,086

(22) Filed: Nov. 19, 2008

(65) Prior Publication Data

US 2009/0126526 A1    May 21, 2009

(30) Foreign Application Priority Data

Nov. 21, 2007  (JP) .................................. 2007-302254

(51) Int. Cl.
F16C 1/10  (2006.01)
(52) U.S. Cl. ..................................................... 74/502.2
(58) Field of Classification Search .................... 74/489, 74/500.5, 501.6, 502.2, 526; 56/10.8
See application file for complete search history.

(56) References Cited

U.S. PATENT DOCUMENTS

| | | | | |
|---|---|---|---|---|
| 5,896,779 | A * | 4/1999 | Biersteker et al. | 74/502.2 |
| 6,247,379 | B1 * | 6/2001 | Chen | 74/502.2 |
| 6,457,377 | B1 * | 10/2002 | Hsu | 74/502.2 |
| 6,647,825 | B1 * | 11/2003 | Lin | 74/502.2 |

FOREIGN PATENT DOCUMENTS

JP  64-114  1/1989

* cited by examiner

*Primary Examiner* — Vicky A Johnson
(74) *Attorney, Agent, or Firm* — Arent Fox LLP (57) ABSTRACT

An operation lever structure wherein an operation lever is pulled toward a left handle to cause a link to swing-move to thereby operate an operation cable. The operation lever structure is configured so that each of inside and outside rollers are provided to an opposite end of the link. Inside and outside guide holes for movably supporting the inside and outside rollers are formed in each of a pair of inside and outside side walls. A discharge opening is formed in a bottom part of the operation lever for discharging a foreign matter that has entered the operation lever.

3 Claims, 9 Drawing Sheets

OPERATION LEVER STRUCTURE

FIELD OF THE INVENTION

The present invention relates to an operation lever structure in which an operation lever is pulled toward a handle, whereby a link is caused to swing, and an operation cable is operated.

BACKGROUND OF THE INVENTION

Amongst operation lever structures of work machines, there is known in the art and disclosed in Japanese Utility Model Application Laid-Open Publication No. 64-114 (JP-U 64-000114 A) an operation lever structure having an operation lever swingably provided to a handle, a link disposed between the operation lever and the handle, one end of the link rotatably attached to the handle, the other end moveably supported on the operation lever, and an operation cable connected to the link.

Rollers are rotatably provided to the other end of the link of the operation lever structure, and the rollers are moveably supported on a bottom part of the operation lever. Accordingly, when the operation lever is gripped and pulled toward the handle, the rollers move along the bottom part of the operation lever, whereby the link moves in a swinging motion around the one end.

According to the above described operation lever structure, gripping the operation lever and pulling toward the handle enables the link to move in a swinging motion and the operation cable to be operated (pulled). Operating (pulling) the operation cable makes it possible to switch between working and stopping operations, such as for braking and clutching.

In a state in which the operation cable is operated (pulled) by the link, the operation cable approaches the one end of the link. Therefore, a decrease is seen in the returning force of the link produced by the reactive force of the operation cable, and the gripping force required for the operator to keep the operation lever in the working position can be minimized.

Therefore, it is conceivable that dirt, rocks, and other foreign matter can enter the bottom part of the operation lever while work is being performed by the work machine. In a case in which foreign matter has entered and accumulated in the bottom part, it becomes difficult for the rollers to move smoothly along the bottom part, and the operability of the operation lever is compromised.

SUMMARY OF THE INVENTION

An object of the present invention is to provide an operation lever structure that can minimize the gripping force required in order to keep the operation lever in the actuating position, and that can improve the operability of the operation lever.

According to the present invention, there is provided an operation lever structure which comprises: an operation lever; and a link, wherein the operation lever includes a pair of side walls and a bottom part that jointly form the operation lever into a substantially U shape in cross-section, and is swingably provided on a handle, the link is disposed between the operation lever and the handle and has one end rotatably attached to the handle and an opposite end movably supported on the operation lever, the link is adapted to allow connection of an operation cable thereto such that the operation cable is operated by pulling the operation lever toward the handle to cause the link to swing, the link has moving parts at the opposite end, the side walls of the operation lever have respective guide holes for movably supporting the moving parts, and the bottom part of the operation lever has a discharge opening for discharging therethrough a foreign matter entered the operation lever.

In this arrangement, disposing the link between the operation lever and the handle enables the full length of the link to be made shorter than the operation lever. It is accordingly possible to ensure that the angle at which the link swings is greater than that of the operation lever. As a result, it is possible to bring the operation cable connected to the link closer to the one end part of the link that acts as a point of support. Therefore, it is possible to reduce the return force of the link derived from the reactive force of the operation cable, and minimize the gripping force required in order for the operator to keep the operation lever in the working position.

Further, the moving parts are provided at the other end of the link and are disposed within the operation lever. The moving parts are moveably supported in a pair of side wall guide holes, whereby the moving parts can be separated from a bottom part. Accordingly, a discharge opening can be provided to the bottom part; and dirt, rocks, and other foreign matter that has entered the operation lever can be discharged through the discharge opening. As a result, the moving parts become capable of moving smoothly along the guide holes without being affected by any foreign matter that has entered, and the operability of the operation lever can be improved.

Preferably, the operation lever has a cover for covering the guide holes and the discharge opening, the cover having an opening in a front part. It is accordingly possible to prevent the fingers from covering the guide holes and blocking the discharge opening when the operation lever is gripped. As a result, the moving parts become capable of moving smoothly along the guide holes, improving the operability of the lever; and foreign matter can be readily discharged through the discharge opening, improving the capacity of the apparatus to discharge foreign matter.

Having the guide holes and the discharge opening covered by the cover makes it possible to prevent dirt, rocks, and other foreign matter from entering the holes.

Additionally, having the guide holes and the discharge opening covered by the cover makes it possible to improve the appearance.

Moreover, the presence of the opening in the front part of the cover allows dirt, rocks, or other foreign matter discharged through the discharge opening to be discharged via the front opening. It is thereby possible to cause the dirt, rocks, or other foreign matter to be discharged away from the operator, and to improve operability.

Desirably, the opening of the cover is disposed so as to face downward in a state in which the operation lever is pulled toward the handle. The dirt, rocks, and other foreign matter discharged through the discharge opening can thereby be even more readily discharged through the front opening.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENTS

A walk-behind power tiller will be described as an example of the work machine according to the present invention.

Figure 1:
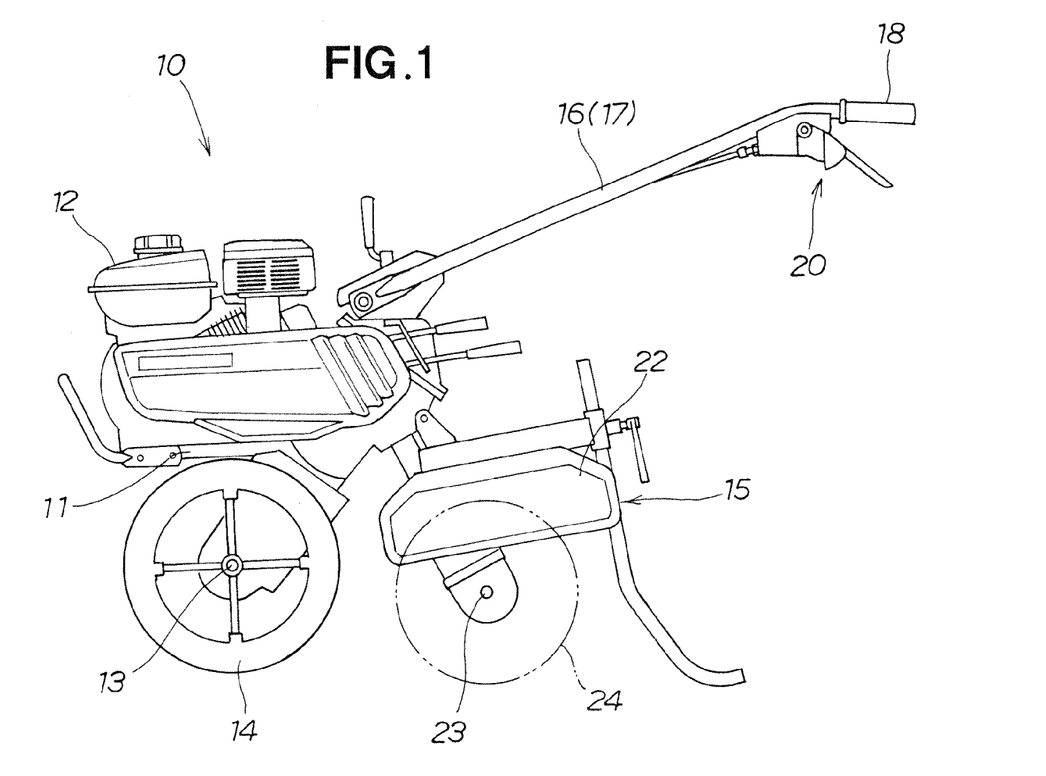
FIG. 1 is a side elevational view showing a walk-behind work machine having an operation lever structure according to the present invention.

As shown in FIG. 1, a walk-behind work machine 10 comprises an engine 12 mounted on an upper part of a machine body 11, left-and-right wheels 14 provided to a lower end part of the machine body 11 via a vehicle shaft 13, a tilling device 15 provided to a rear part of the machine body 11, left-and-right handles 16, 17 provided to the rear part of the machine body 11, and an operation lever structure 20 provided to the vicinity of a left gripping part 18 of the left handle 16.

The tilling device 15 comprises a tilling cover 22 attached to the rear part of the machine body 11 so as to be capable of moving up and down, a tilling claw 24 provided underneath the tilling cover 22 on a rotating shaft 23, and a power transmission part (not shown) for transferring the rotation of the engine 12 to the rotational shaft 23.

The engine 12 is driven, the left-and-right wheels 14 rotate, and the tilling claw 24 rotates, whereby the work of tilling the soil is performed by the tilling claw 24 while the left-and-right wheels 14 cause the walk-behind work machine 10 to advance.

Figure 2:
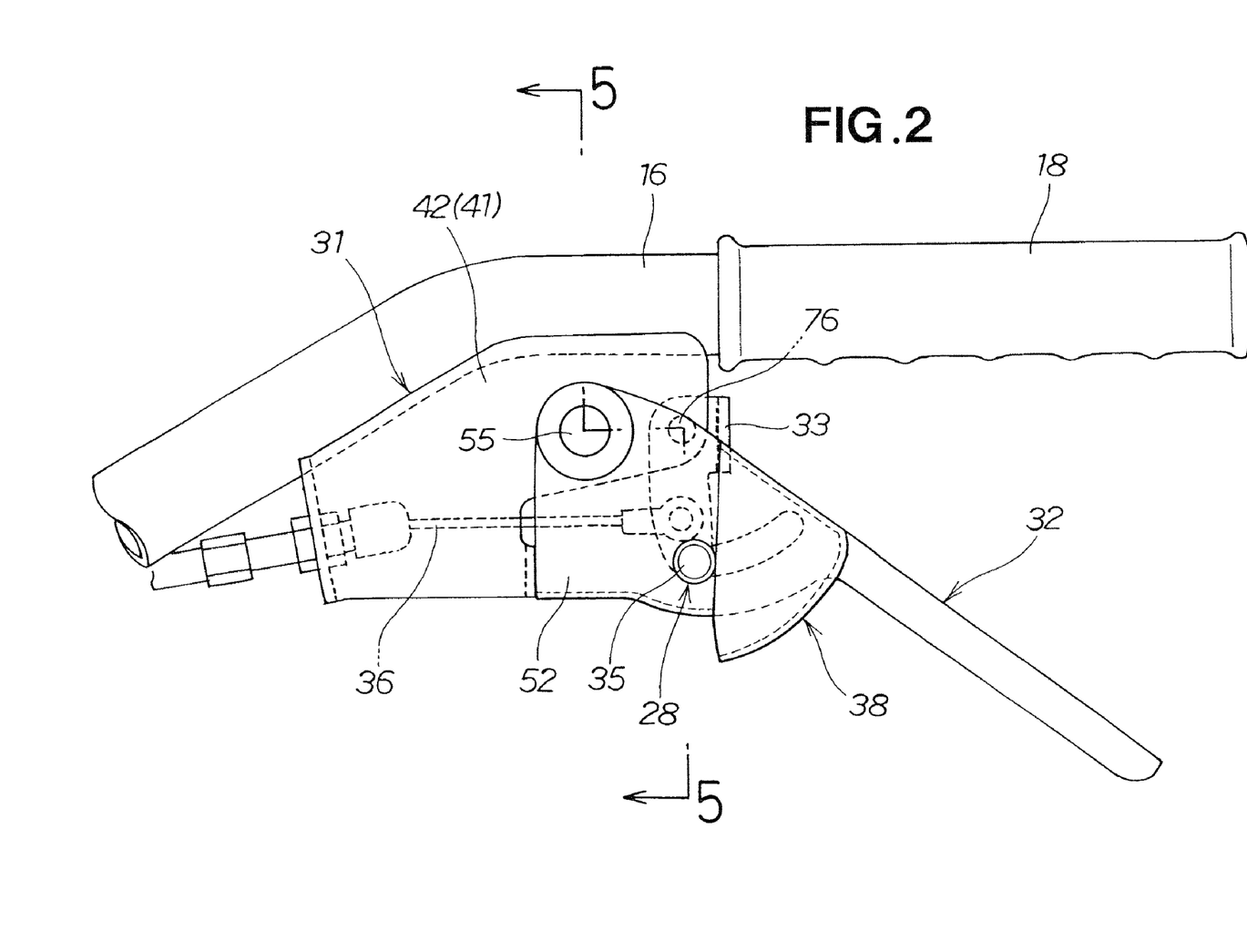
FIG. 2 is a side elevational view showing the operation lever structure shown in FIG. 1.

As shown in FIG. 2, the operation lever structure 20 comprises an attachment bracket 31 provided to the lower part of the vicinity of the left gripping part 18 of the left handle 16, an operation lever 32 swingably provided to the attachment bracket 31, a link 33 disposed between the operation lever 32 and the left handle 16, connecting means 28 for moveably connecting the link 33 to the operation lever 32, an operation cable 36 connected to the link 33, and a cover 38 provided to the operation lever 32.

Figure 3:
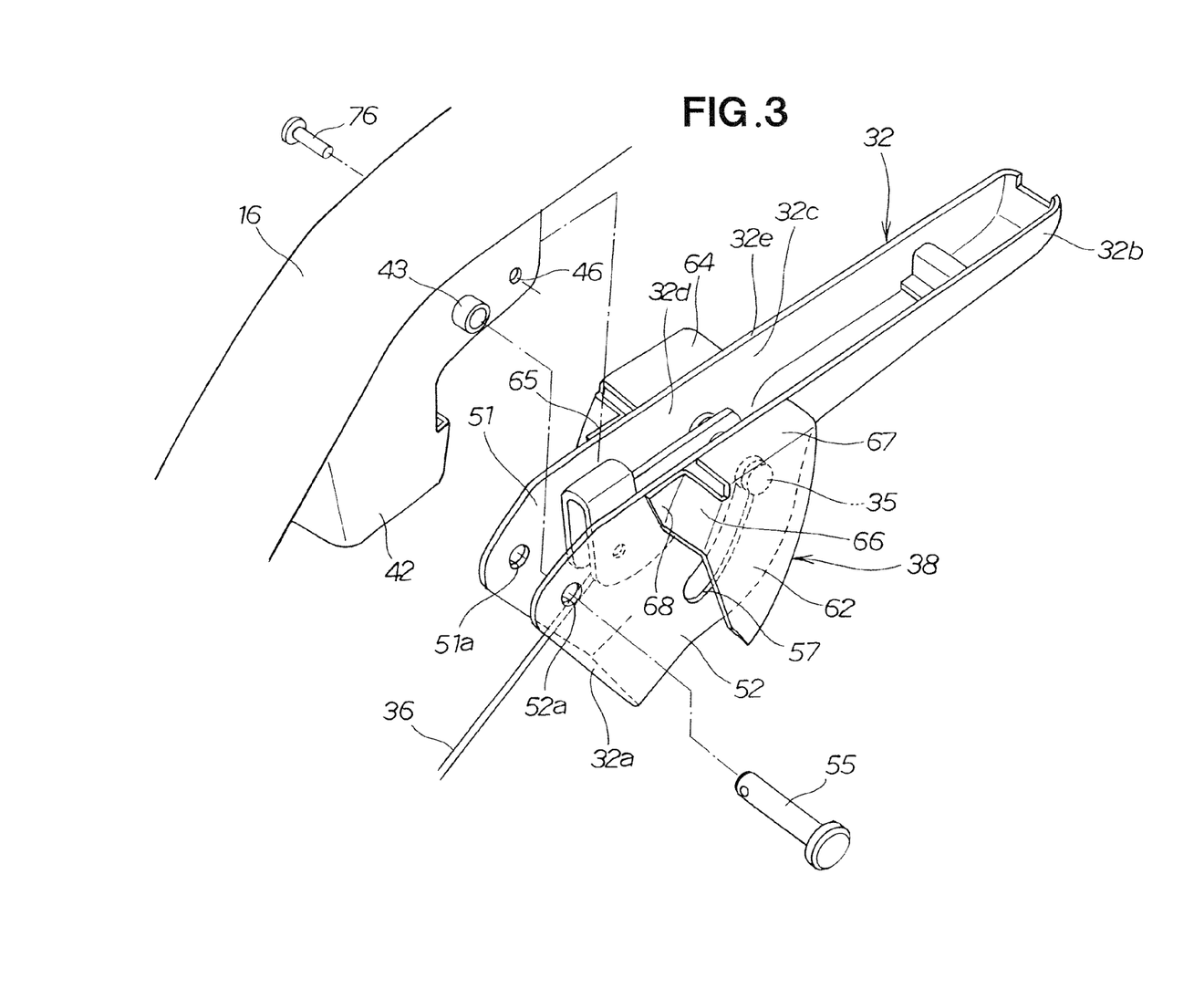
FIG. 3 is a perspective view illustrating the operation lever structure shown in FIG. 2.
Figure 4:
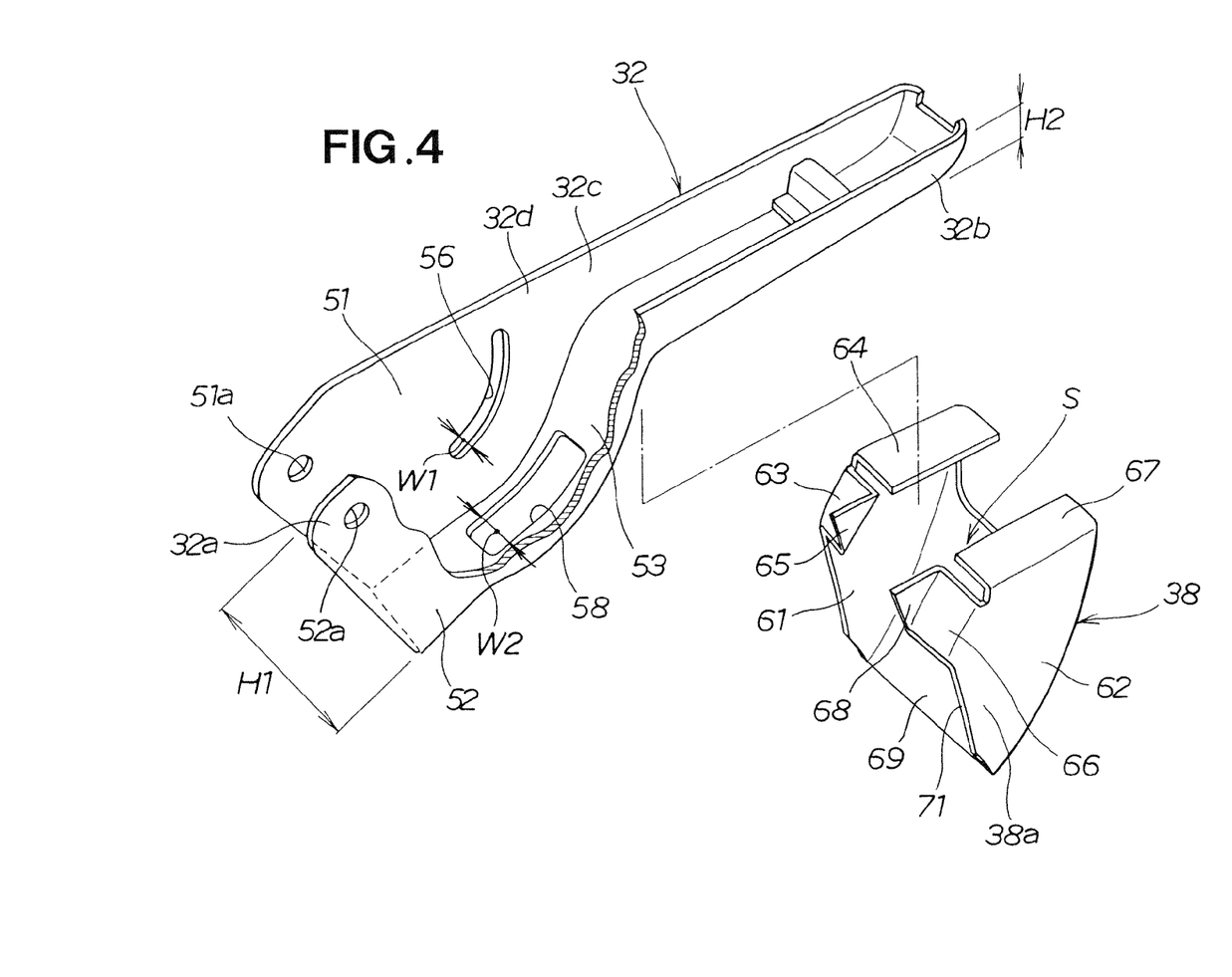
FIG. 4 is a perspective view showing the operation lever shown in FIG. 3.
Figure 5:
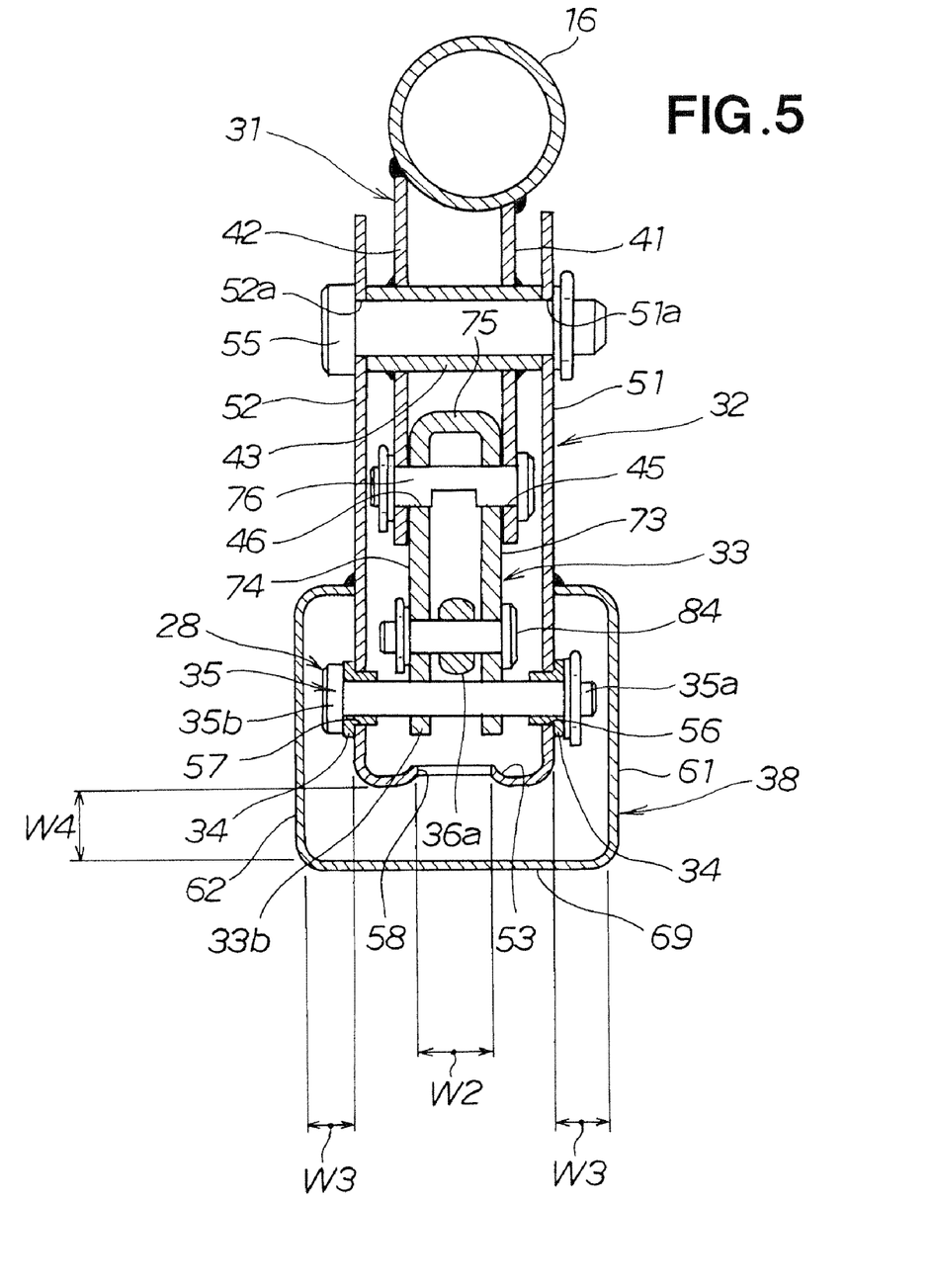
FIG. 5 is a cross-sectional view taken along line 5-5 of FIG. 2.

As shown in FIGS. 3 to 5, the attachment bracket 31 comprises an inside bracket side wall 41 and an outside bracket side wall 42 extending downward from the lower part of the left handle 16, and a hollow support tube 43 that passes through the inside and outside bracket side walls 41, 42.

Inside and outside anchoring holes 45, 46 are formed rearward of the support tube 43 on each of the inside and outside bracket side walls 41, 42.

The operation lever 32 has a substantially U-shaped cross-section formed from inside and outside side walls (a pair of side walls) 51, 52 and a bottom part 53 that connects the inside and outside side walls 51, 52. A support pin 55 passes through support holes 51a, 52a formed in the inside and outside side walls 51, 52 and the support tube 43, whereby the operation lever 32 is swingably provided on the support pin 55.

As shown in FIG. 4, a height H1 of a front end part 32a of the operation lever 32 is formed to be greater than a height H2 of a rear end part 32b.

The bottom part 53 of the operation lever 32 extends in a curved shape from the vicinity of the front end part 32a towards a central part 32c. The height of the central part 32c is the same as the height H2 of the rear end part 32b.

An inside guide hole (guide hole) 56 is formed in the inside side wall 51, and an outside guide hole (guide hole) 57 (see FIG. 3) is formed in the outside side wall 52. The inside and outside guide holes 56, 57 are formed in a curved shape following that of the bottom part 53. A discharge opening 58 is formed in the bottom part 53.

The cover 38 is provided to a front region 32d of the central part 32c of the operation lever 32.

The cover 38 comprises inside and outside cover side walls 61, 62, a cover bottom part 69 for joining the inside and outside cover side walls 61, 62 together, front and rear inside cover upper parts 63, 64 provided to the upper end part of the inside cover side wall 61, an inside protuberance 65 projecting from the front inside cover upper part 63, front and rear outside cover upper parts 66, 67 provided to the upper end part of the outside cover side wall 62, and an outside protuberance 68 projecting from the front outside cover upper part 66.

A space S is formed between the front and rear inside cover upper parts 63, 64 and the front and rear outside cover upper parts 66, 67, and an opening 71 is formed in a front part 38a.

The cover 38 is fitted onto the operation lever 32 using the space S of the cover, and the rear inside cover upper part 64 and the rear outside cover upper part 67 are disposed flush with an upper area 32e (see FIG. 3) of the operation lever 32.

As shown in FIG. 3, the inside protuberance 65 is welded to the inside side wall 51, and the outside protuberance 68 is welded to the outside side wall 52, whereby the cover 38 is attached to the operation lever 32. In this state, the inside and outside guide holes 56, 57 and the discharge opening 58 can be covered by the cover 38.

It is accordingly possible to prevent the inside and outside guide holes 56, 57 from being covered by the fingers, and the discharge opening 58 from being blocked by the fingers when the operation lever 32 is gripped.

Having the cover 38 cover the inside and outside guide holes 56, 57 and the discharge opening 58 makes it possible to prevent dirt, rocks, and other foreign matter from entering through the inside and outside guide holes 56, 57.

Additionally, having the cover 38 cover the inside and outside guide holes 56, 57 and the discharge opening 58 makes it possible to improve the appearance.

Moreover, the presence of the opening 71 in the front part 38a of the cover 38 allows dirt, rocks, or other foreign matter 88 (see FIG. 9) discharged through the discharge opening 58 and the inside and outside guide holes to be discharged via the opening 71.

The opening 71 opens on the side opposite the operator, and therefore it is possible to cause the dirt, rocks, or other foreign matter 88 to be discharged away from the operator.

The opening 71 formed in the front part 38a of the cover 38 is disposed so as to face downward (see FIG. 6) in a state in which the operation lever 32 has been pulled toward the left handle 16 (left grip 18).

As shown in FIG. 5, the link 33 is disposed between the operation lever 32 and the left handle 16.

An inside link piece 73 and an outside link piece 74 of the link 33 are provided across a fixed gap, and the inside and outside link pieces 73, 74 are integrally connected by a linking piece 75.

One end part 33a of the link 33 is pivotably supported on the attachment bracket 31 via a support pin 76.

The support pin 76 is attached to an inside support hole 45 of the inside bracket side wall 41 and to an outside support hole 46 of the outside bracket side wall 42.

Figure 6:
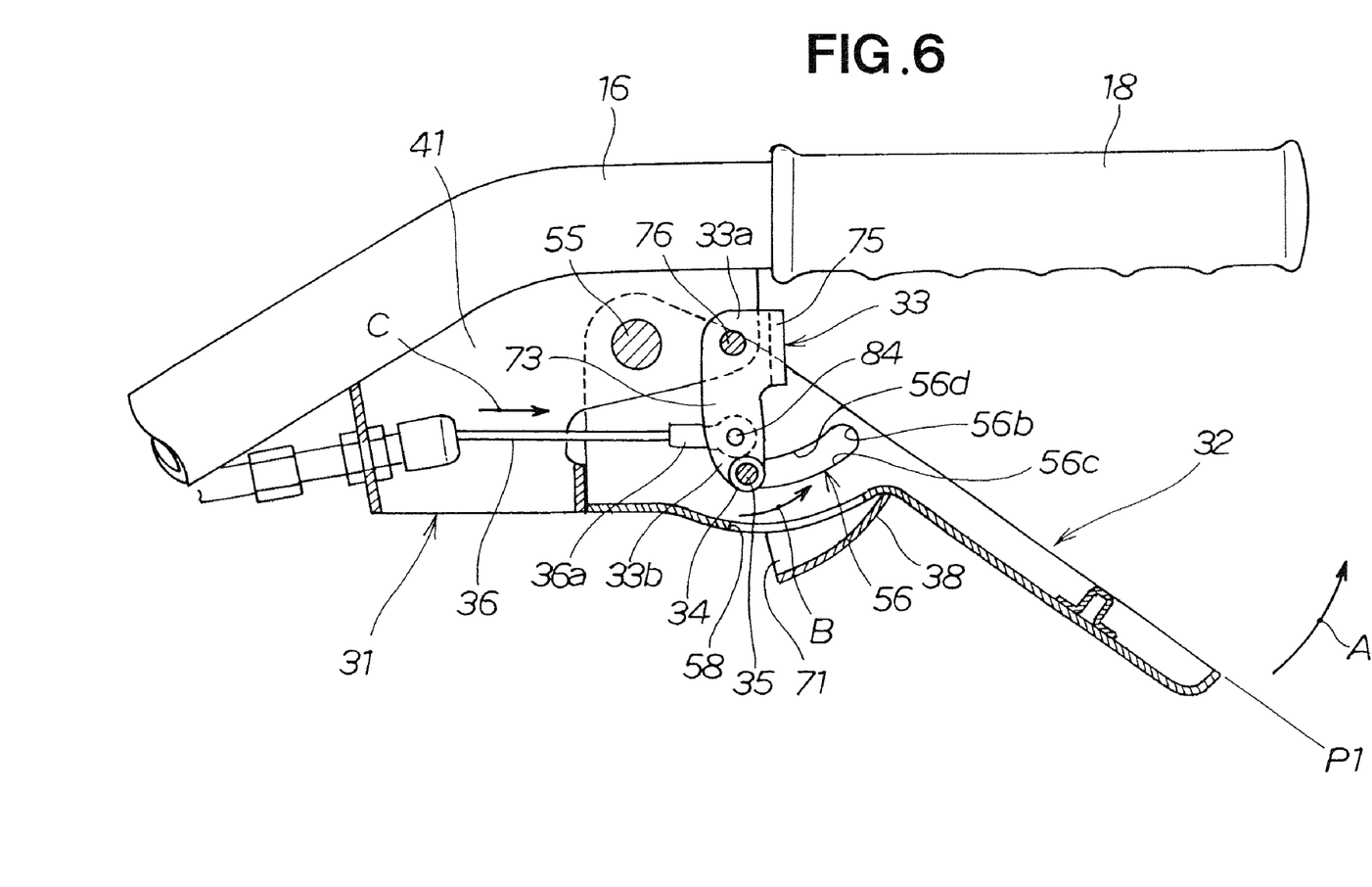
FIG. 6 is a cross-sectional view showing the operation lever of FIG. 2 in a clutch-disengaged state.

As shown in FIG. 6, the link 33 is offset so as to be separated to the rear of the support pin 55 by a predetermined distance. Accordingly, the center of the swinging movement of the link 33 is offset rearward from the center of the swinging movement of the operation lever 32.

As shown in FIG. 5, the link 33 is connected to the operation lever 32 by the connecting means 28 provided to another end part 33b.

The connecting means 28 comprises a pivot pin 35 provided to the other end part 33b. A distal end part 35a of the moving pin 35 protrudes from the inside link piece 73. An inside roller (moving part) 34 is rotatably attached to the distal end part 35a. A head part 35b of the moving pin 35 protrudes from the outside link piece 74. An outside roller (moving part) 34 is rotatably attached to the moving pin 35 at the head part 35b side.

The inside and outside rollers 34 are moveably supported in each of the inside and outside guide holes 56, 57. Accordingly, the other end part 33b of the link 33 is moveably supported on the inside and outside side walls 51, 52.

A rear end part 36a of the operation cable 36 is connected via a connecting pin 84 to the link 33 in the vicinity of the other end part 33b.

The reference symbol W1 designates the width of the inside and outside guide holes 56, 57 (see FIGS. 3 and 4) and the reference symbol W2 designates the width of the discharge opening 58.

The reference symbol W3 designates the amount of space between the inside side wall 51 and the inside cover side wall 61, the reference symbol W3 designates the amount of space between the outside side wall 52 and the outside cover side wall 62, and the reference symbol W4 designates the amount of space between the bottom part 53 and the cover bottom part 69.

The relationship $W1 \leqq W3 \leqq W4$ is established, taking the width of the inside and outside guide holes 56, 57 as W1, the amount of space between the inside side wall 51 and the inside cover side wall 61 as W3, the amount of space between the outside side wall 52 and the outside cover side wall 62 as W3, and the amount of space between the bottom part 53 and the cover bottom part 69 as W4.

As a result, the dirt, rocks, or other foreign matter 88 (see FIG. 9) discharged into the cover 38 from the inside and outside guide holes 56, 57 are readily guided to the cover bottom part 69 of the cover 38.

The relationship $W2 \leqq W4$ is established with regard to the width W2 of the discharge opening 58 and the amount of space W4 between the bottom part 53 and the cover bottom part 69.

As a result, the dirt, rocks or other foreign matter 88 (see FIG. 9) are readily guided from the discharge opening 58 to the cover bottom part 69 of the cover 38.

The inside and outside guide holes 56, 57 shall now be described with reference to FIGS. 6 and 7. The inside and outside guide holes 56, 57 have the same shape; therefore, the inside guide hole 56 shall be described without a description of the outside guide hole 57 being provided.

The inside guide hole 56 moves about the support pin 55. The inside roller 34 moves about the support pin 76.

Therefore, the shape of the inside guide hole 56 can be formed so as to cause the inside roller 34 to move rearward while the operation lever 32 is moved from a clutch-disengaged position P1, to a clutch-engaged position P2.

In this case, the inside roller 34 moves along the inside guide hole 56 from a front end part 56a to a rear end part 56b.

In order for these conditions to be fulfilled, the inside guide hole 56 is formed into a curve-shaped hole by the curve-shaped inside and outside side areas 56c, 56d and front and rear end parts 56a, 56b.

The inside and outside rollers 34 are moveably supported in the inside and outside guide holes 56, 57, and are thereby able to be released from the bottom part 53.

Accordingly, the discharge opening 58 is provided to the bottom part 53, and the dirt, rocks and other foreign matter 88 (see FIG. 9) that have entered the operation lever 32 can be discharged through the discharge opening 58.

As a result, the inside and outside rollers 34 are able to move smoothly along the inside and outside guide holes 56, 57 without being affected by the foreign matter 88 that has entered.

The cover bottom part 69 of the cover 38 is formed so as to face downward toward the opening 71 in a state in which the operation lever 32 is disposed between the clutch-disengaged position P1 and the clutch-engaged position P2.

This arrangement allows the dirt, rocks and other foreign matter 88 (see FIG. 9) that have been discharged through the discharge opening 58 to be readily discharged through the opening 71.

The opening 71 is disposed facing downward particularly in the clutch-engaged state, in which the operation lever 32 is pulled toward the left handle 16 (left grip 18). This arrangement allows the dirt, rocks and other foreign matter 88 (see FIG. 9) that have been discharged through the discharge opening 58 to be even more readily discharged through the opening 71.

An example in which the operation lever 32 is moved from the clutch-disengaged position P1 to the clutch-engaged position P2 shall now be described with reference to FIGS. 6 and 7.

As shown in FIG. 6, pulling the operation lever 32 toward the left handle 16 (left grip 18) swings the operation lever 32 away from the clutch-disengaged position P1 as indicated by arrow A around the support pin 55.

Accordingly, the inside guide hole 56 moves about the support pin 55 as indicated by arrow A. Through this action the inside roller 34 is pulled rearward by the front end part 56a of the inside guide hole 56 (see FIG. 7).

The other end part 33b of the link 33 connected to the inside roller 34 via the moving pin 35 is pulled rearward.

The link 33 begins to swing in the counterclockwise direction about the support pin 76 as indicated by arrow B.

The swinging of the link 33 causes the operation cable 36 to be moved (pulled) as indicated by arrow C.

The inside guide hole 56 continues to move about the support pin 55, whereby the inside roller 34 is pulled rearward by the outside side area 56c of the inside guide hole 56. Accordingly, the inside roller 34 moves along the inside guide hole 56 toward the rear end part 56b. This action causes the link 33 to continue to swing in the direction indicated by arrow B about the support pin 76.

The continuing of the link 33 to swing causes the operation cable 36 to continue to be operated (be pulled) as well.

Figure 7:
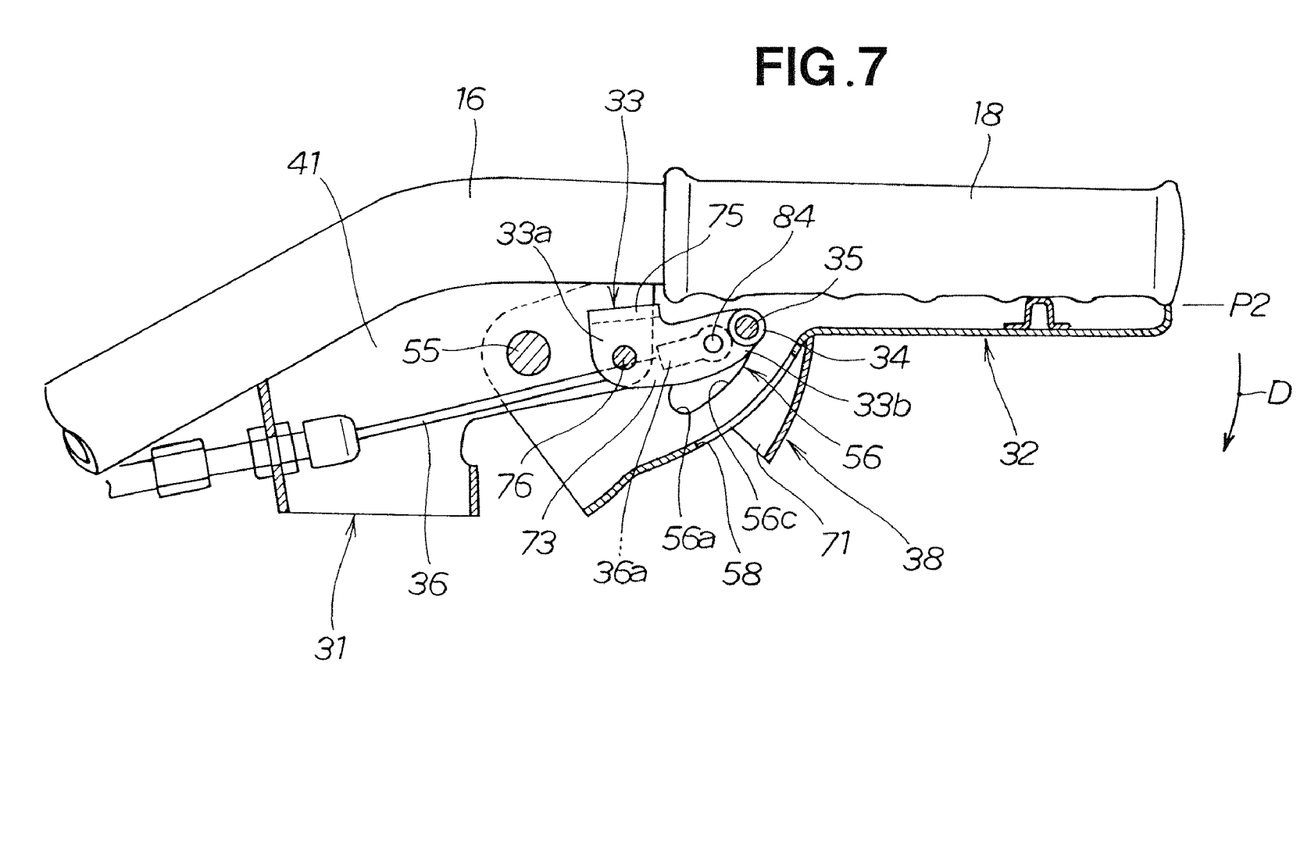
FIG. 7 is a cross-sectional view showing the operation lever of FIG. 6 in a clutch-engaged state.

As shown in FIG. 7, the operation lever 32 is disposed in the clutch-engaged position P2 in a state wherein the operation lever 32 is pushed against the left handle 16 (left grip 18).

The inside roller 34 reaches the rear end part 56b of the inside guide hole 56 (see FIG. 6), and the operation cable 36 is pulled to the clutch-engaged position.

In this state, the operation cable 36 connected to the link 33 approaches the support pin 76. It is accordingly possible to reduce the return force of the link 33 derived from the reactive force of the operation cable 36, and to minimize the gripping force required by the operator in order to keep the operation lever 32 in the clutch-engaged position P2 with their left hand.

The link 33 is provided between the operation lever 32 and the left handle 16, and the operation cable 36 is connected to the link 33. Therefore, the amount of movement required when moving the operation lever 32 from the clutch-disengaged position P1 to the clutch-engaged position P2 is minimized, and the operation cable 36 can be kept at an appropriate amount of tension.

The gripping force required in order to keep the operation lever 32 in the clutch-engaged position P2 and the amount of movement of the operation lever 32 are thus minimized, thereby improving the operating characteristics.

To return the operation lever 32 to the clutch-disengaged position P1, the fingers are removed from the operation lever 32, and the hold on the operation lever 32 is released.

The spring force of a return spring (not shown) provided to the operation lever 32 and the return force of the operation cable 36 cause the operation lever 32 to swing away from the clutch-engaged position P2 about the support pin 55, as indicated by arrow D.

The link 33 swings in the clockwise direction about the support pin 76, in concert with the swinging of the operation lever 32. This movement causes the operation lever 32 to return to the clutch-disengaged position P1 from the clutch-engaged position P2.

A state in which the operation lever 32 is gripped in the left hand 85 shall now be described with reference to FIGS. 8A and 8B.

Figure 8A:
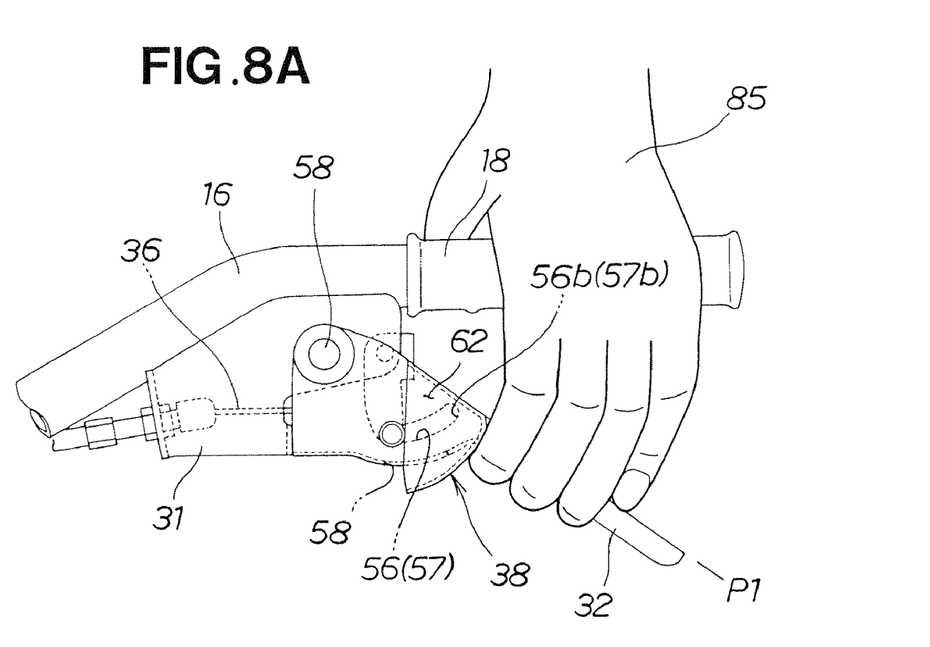
FIGS. 8A and 8B are schematic views showing the operation lever of FIG. 2 in operation.

FIG. 8A shows a state in which the operation lever 32 is gripped in the left hand 85 while in the clutch-disengaged position P1.

A region of the inside and outside guide holes 56, 57 excluding the front end parts 56a, 57a is covered by the inside and outside side walls 61, 62 (see FIG. 4) of the cover 38.

Substantially the rear half portion of the discharge opening 58 is covered by the cover bottom part 69 (see FIG. 4) of the cover 38. It is accordingly possible to prevent the fingers (particularly the thumb and forefinger) of the left hand 85 gripping the operation lever 32 from covering the inside and outside guide holes 56, 57 and blocking the discharge opening 58.

Figure 8B:
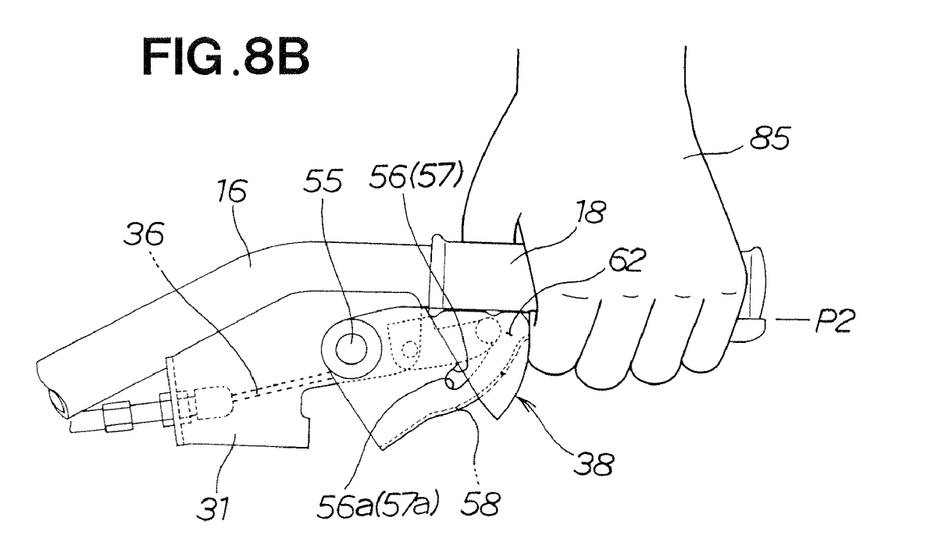

FIG. 8B shows a state in which the operation lever 32 is gripped by the left hand 85 while in the clutch-engaged position P2.

As illustrated in FIG. 8A, a region of the inside and outside guide holes 56, 57 excluding the front end parts 56a, 57a and substantially the rear half portion of the discharge opening 58 are covered by the cover 38. It is accordingly possible to prevent the fingers (particularly the thumb and forefinger) of the left hand 85 gripping the operation lever 32 from covering the inside and outside guide holes 56, 57 and blocking the discharge opening 58.

It is thus possible to prevent the fingers from covering the inside and outside guide holes 56, 57 and blocking the discharge opening 58 when the operation lever 32 is gripped by the left hand 85; therefore, the inside and outside rollers 34 are caused to move smoothly along the inside and outside guide holes 56, 57 and the operability of the lever is improved. In addition, it is possible for the foreign matter 88 (see FIG. 9) to be readily discharged through the discharge opening 58 and to improve the capacity of the apparatus to discharge foreign matter.

A case in which dirt, rocks, or other foreign matter have entered the operation lever 32 shall now be described with reference to FIGS. 9A and 9B.

Figures 9A, 9B:
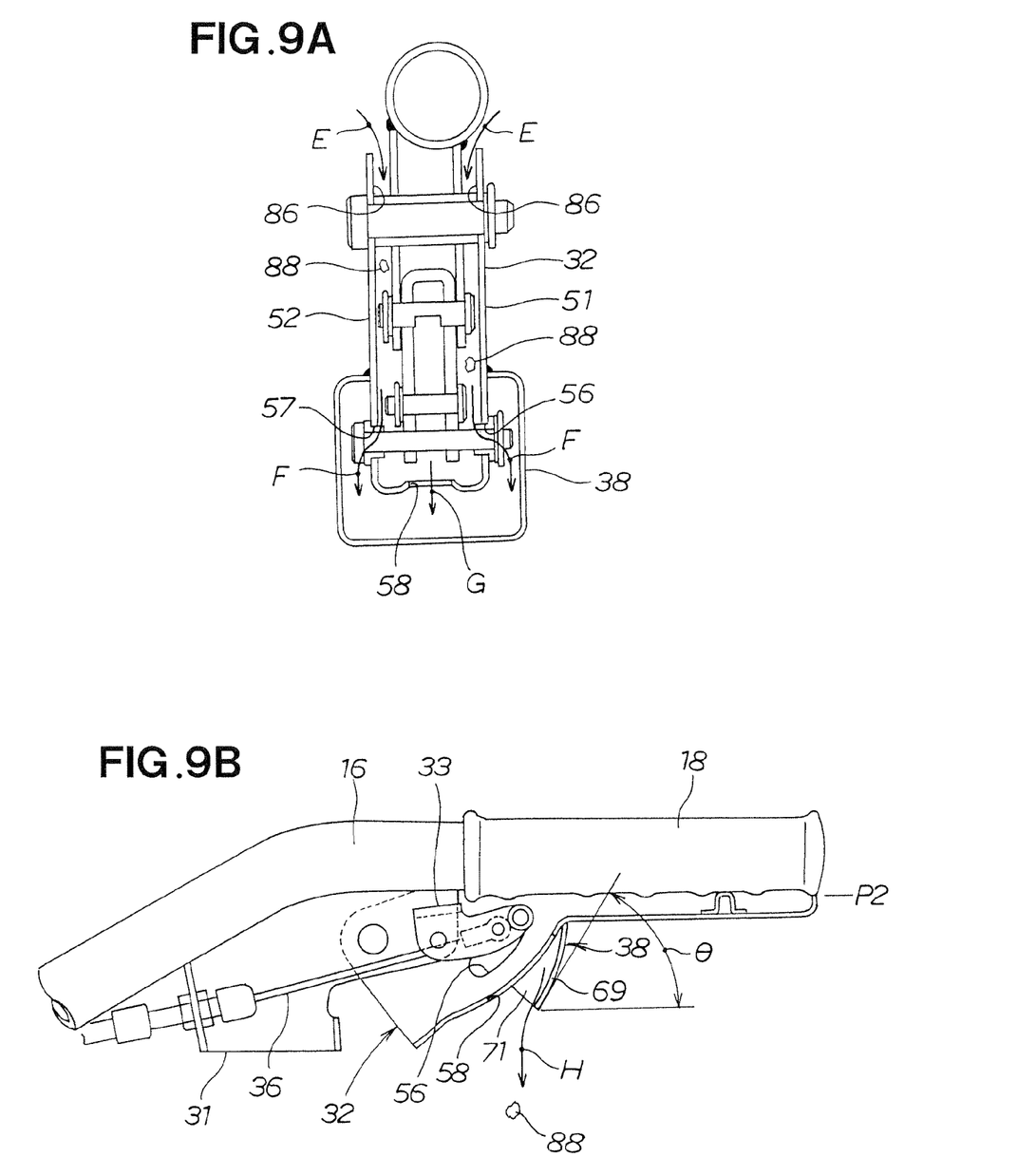
FIGS. 9A and 9B are schematic views showing states in which dirt, rocks, and other foreign matter that have entered the operation lever are discharged.

In FIG. 9A, dirt, rocks and other foreign matter (hereinbelow referred to as "foreign matter") 88 enter as shown by arrow E through left and right upper openings 86 of the operation lever 32.

The foreign matter 88 that has entered descends along the inside and outside side walls 51, 52. Some of the descending foreign matter 88 is guided through the inside and outside guide holes 56, 57 into the cover 38 as indicated by arrow F. The remaining foreign matter 88 is guided through the discharge opening 58 into the cover 38 as indicated by arrow G.

In FIG. 9B, the foreign matter 88 that has been guided into the cover 38 descends to the ground through the opening 71 as indicated by arrow H.

Keeping the operation lever 32 in the clutch-engaged position P2 increases the angle of inclination θ of the cover bottom part 69 of the cover 38. Therefore, the foreign matter 88 that has been guided inside the cover 38 can slide readily down to the opening 71, and reliably be allowed to fall through the opening 71. As a result, the foreign matter 88 that has entered the operation lever 32 can be reliably discharged. Therefore, the inside and outside rollers 34 can be caused to move smoothly along the inside and outside guide holes 56, 57 without being affected by any foreign matter 88 that has entered, and the operability of the operation lever 32 can be improved. Moreover, since the opening 71 opens on the side opposite the operator, it is possible to cause the dirt, rocks, or other foreign matter 88 to be discharged away from the operator, and operability can be further improved.

In the abovedescribed embodiment, an example is shown of an operation lever structure applied to a walk-behind power tiller 10; however, the present invention is not limited thereto, and the operation lever structure can be applied to walk-behind lawn mowers, walk-behind grass cutters, and other work machines.

In the abovedescribed embodiment, an example is described of the operation lever structure applied to a clutch lever; however, the present invention is not limited thereto, and can be applied to brake levers and other operation lever structures.

In the abovedescribed embodiment, an example is described in which inside and outside rollers 34 serving as inside and outside moving bodies are rotatably provided to the moving pin 35; however, the present invention is not limited thereto, and it is also possible for the inside and outside rollers 34 to be non-rotatably provided to the moving pin 35. In a case in which the inside and outside rollers 34 are non-rotatably provided, the inside and outside rollers 34 slide along the inside and outside guide holes 56, 57 and thereby move.

The present invention is suitably applied in work machines having an operation lever structure for pulling an operation lever toward a handle, and thereby operating an operation cable.

Obviously, various minor changes and modifications of the present invention are possible in light of the above teaching. It is therefore to be understood that within the scope of the appended claims the invention may be practices otherwise than as specifically described.

What is claimed is:
1. An operation lever structure comprising:
an attachment bracket mounted to a handle;
an operation lever swingably provided on the attachment bracket, the operation lever including a pair of side walls and a bottom part that jointly form the operation lever into a substantially U shape in cross-section;

a link having one end pivotally connected to the attachment bracket and an opposite end moveable along a pair of guide holes formed in the side walls of the operation lever; and an operation cable having an end pivotally connected to the link proximate the opposite end of the link, wherein the link is disposed between the operation lever and the handle and the opposite end is movably supported on the operation lever, the operation cable is operated by pulling the operation lever toward the handle to cause the link to swing, and the bottom part of the operation lever has a discharge opening for discharging therethrough a foreign matter entered the operation lever.

2. The operation lever structure of claim 1, further comprising a cover for covering the guide holes and the discharge opening, the cover having an opening in a front part thereof.

3. The operation lever structure of claim 2, wherein the opening of the cover is disposed to be oriented downward when the operation lever is pulled toward the handle.

* * * * *